A. H. LUNDSTROM.
DEMOUNTABLE TIRE RIM.
APPLICATION FILED MAR. 12, 1920.
1,406,664.  Patented Feb. 14, 1922.
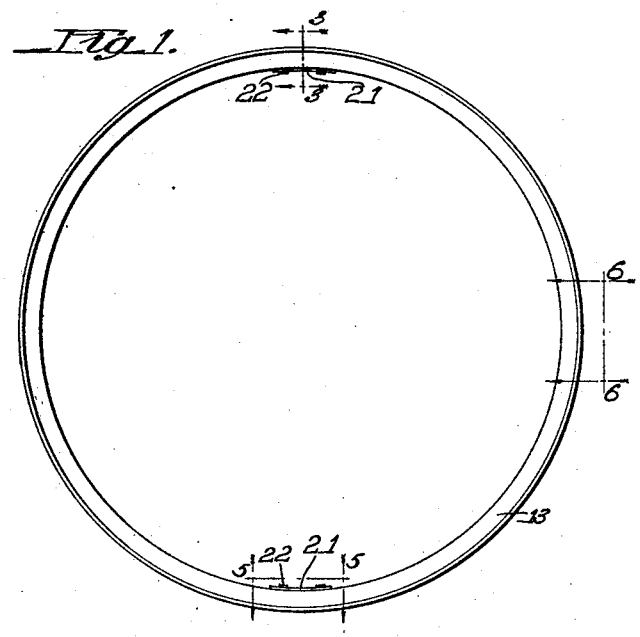
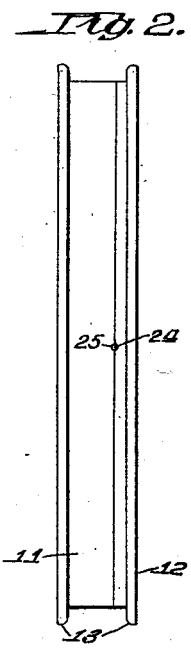
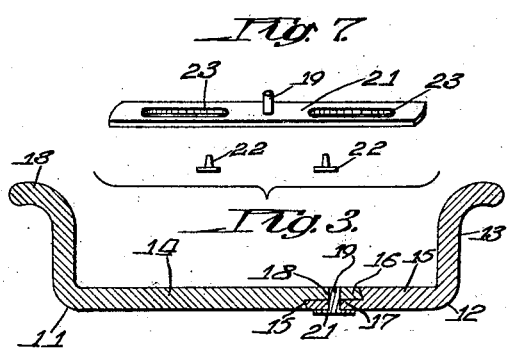
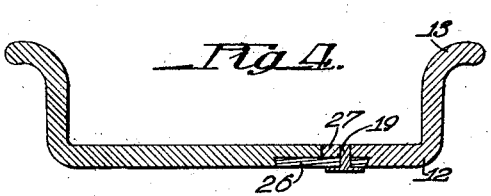
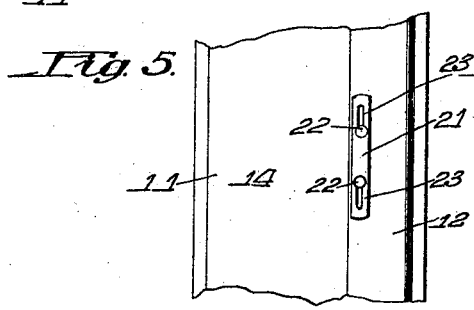
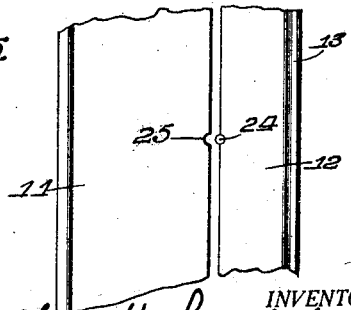
INVENTOR.
Alfred H. Lundstrom
BY
ATTORNEY.

UNITED STATES PATENT OFFICE.

ALFRED HERMAN LUNDSTROM, OF ROCKFORD, ILLINOIS.

DEMOUNTABLE TIRE RIM.

1,406,664.  Specification of Letters Patent.  Patented Feb. 14, 1922.

Application filed March 12, 1920. Serial No. 365,192.

*To all whom it may concern:*

Be it known that I, ALFRED H. LUNDSTROM, a citizen of the United States, residing at Rockford, in the county of Winnebago and State of Illinois, have invented certain new and useful Improvements in Demountable Tire Rims, of which the following is a specification.

This invention pertains in general to the class of wheels, and has more particular reference to demountable tire rims such as are used on automobile and truck wheels.

The primary object of the present invention is to provide a demountable rim of such simple and novel construction as to permit quick and easy placement of a tire upon the rim and removal of the tire therefrom, thus obviating the trouble and difficulty attendant upon these operations when demountable rims of the ordinary construction are used.

In furtherance of this general object, my invention contemplates the provision of a demountable tire rim formed of two annular sections which are joined, preferably between the side flanges by means of a lapped joint. My invention also contemplates the provision of novel means operative between the lapped joint sections for holding them in operative relation and permitting quick separation and removal of one of the sections so that the tire may be quickly and easily mounted upon or removed from the other section.

Other objects and attendant advantages relative to the preferred embodiment of my improvements will be better understood by reference to the following description when considered in connection with the accompanying drawing, in which—

Figure 1 is a side view of a demountable tire rim embodying my improvements;

Fig. 2, an edge view of the rim;

Fig. 3, an enlarged cross sectional view through the rim taken on the line 3—3 of Fig. 1;

Fig. 4, a similar sectional view showing a modified form of lapped joint;

Figs. 5 and 6, fragmentary views taken on the lines 5—5 and 6—6, respectively, of Fig. 1; and Fig. 7, a perspective view of the locking member and parts associated therewith.

My improvements relate to the well known class of demountable tire rims, and are adapted to any style of such rims, which are shaped to accommodate either straight-side or clincher tires. In the present instance, I have taken as an example a straight-side rim. According to my improvements the rim is formed of two annular sections designated generally by characters 11 and 12 having the usual flanges 13. The rim proper 14 is parted circumferentially between the flanges 13, providing separable rim sections already mentioned. The contiguous edges of these rim sections are so shaped as to provide a lapped joint; and it is preferred that the ends 15 of the lapped portions 16 and 17 shall be beveled as shown plainly in Fig. 3, to aid in holding these sections in operative relation.

My invention now provides means operative between the lapped portions 16 and 17 for holding the rim sections in operative relation and permitting quick separation of said sections. This means in the present instance, consists of a plurality of openings, sockets or recesses 18 formed in the rim portion 16, and parts 19 carried by the rim portion 17 and adapted to enter the openings 18 for holding the rim sections together. The parts 19 are respectively secured to flexible or resilient plates 21 which are held against the underside of the rim portion 17 by means of headed members 22 passing through slots 23 in the plates 21 and rigidly secured as by riveting, to the rim portion 17. In order to withdraw the part 19 from its respective opening 18, a screw driver on any pointed implement will be inserted between the plate 21 and the rim portion 17 at a point intermediate the headed members 22 for the purpose of flexing the plate and withdrawing the part 19 from said opening. Any suitable number of the above described connecting devices might be employed, and in the present case I have shown but two, arranged on diametrically opposite sides of the rim. In order to properly locate one rim section with respect to the other when assembling said sections, I have equipped one with a locating projection 24, Fig. 6, adapted to enter a recess 25 in the other.

It will be manifest that in assembling, the rim sections will be relatively adjusted rotatably until the locating parts 24 and 25 are aligned, whereupon the parts 19 which have been held withdrawn are permitted to enter the openings 18, thereby locking the rim sections in operative relation. It will also be evident that the matter of placing a tire on a rim of this kind or removing it therefrom is made comparatively easy by the ability to remove one of the rim flanges. When the tire is in place on the rim and the latter mounted on a wheel, the plates 21 will be held by the wheel rim against inward movement and thus locked in position.

In Fig. 4, I have shown a somewhat modified form of lapped joint in which the rim section 11 is equipped with a band 26 which underlaps the rim portion 27 of the section 12. A connecting means such as described above containing a resilient plate equipped with a finger 19 is provided for operation between the parts 26 and 27 and functions in the same manner as in the first mentioned case.

It is believed that the foregoing conveys a clear understanding of the objects prefaced above and of the principles of my invention, and while I have illustrated and described but a single embodiment, it should be understood that various changes might be made in the construction and arrangement without departing from the spirit and scope of the invention as expressed in the appended claims, in which:

I claim:

1. A tire rim of the character described comprising two sections parted circumferentially between the side flanges, and a plurality of locking means detachably connecting said sections at spaced points, each means comprising an elongated resilient plate slidably supported at each end on one of said sections with capacity for flexing at its medial portion, a lug carried by said plate at its medial portion, and means on the other rim section for the reception of said lug.

2. A tire rim of the character described comprising two annular sections having a lap joint intermediate the side flanges, and a plurality of locking means detachably connecting said sections at spaced points, each means comprising registering holes through the lapped portions of said sections, a lug adapted to fit registering holes for holding the rim sections against relative displacement, and a resilient plate carrying said lugs and slidably mounted on one of said rim sections with capacity for movement in the plane of said joint, adapted for normally holding the lug in said holes and permitting quick withdrawal of the lug from one of the holes.

3. A demountable tire rim comprising two annular sections having a lap joint intermediate the side flanges, and a plurality of locking means detachably connecting said sections at spaced points, each means comprising registering holes in the lapped portions, a resilient plate equipped intermediate its ends with a lug adapted to fit in said registering holes for holding the rim sections against relative displacement, and having a slot in each end, and means disposed in said slots and connected to one of the rim sections for supporting said plate in operative position and with capacity for flexing medially to permit withdrawal of the lug from one of said holes.

ALFRED HERMAN LUNDSTROM.